United States Patent [19]

Kaney

[11] Patent Number: 4,478,584

[45] Date of Patent: Oct. 23, 1984

[54] METHOD FOR RECORDING UNCODED SCORES OR RATINGS BY MULTIPLE EVALUATORS ON A SINGLE AUTOMATIC MACHINE SCANNABLE DOCUMENT

[76] Inventor: Kathryn Kaney, 12101 N. Dale Mabry, Apt. 902, Tampa, Fla. 33618

[21] Appl. No.: 526,618

[22] Filed: Aug. 26, 1983

[51] Int. Cl.³ .............................................. G09B 3/00
[52] U.S. Cl. .................................................. 434/353
[58] Field of Search ....................... 434/353, 363, 364

[56] References Cited

U.S. PATENT DOCUMENTS

| | | | |
|---|---|---|---|
| 2,052,369 | 8/1936 | Toops | 434/363 |
| 2,373,498 | 4/1945 | Parmenter | 434/363 X |
| 2,977,689 | 4/1961 | Rugland et al. | 434/353 |
| 3,086,300 | 4/1963 | Rugland et al. | 434/353 |
| 3,089,260 | 5/1963 | Gray | 434/364 |
| 3,203,116 | 8/1965 | Shaw et al. | 434/363 |
| 3,266,049 | 8/1966 | Parmenter | 434/363 |
| 3,900,961 | 8/1975 | Sokolski et al. | 434/363 |

Primary Examiner—William H. Grieb
Attorney, Agent, or Firm—Arthur W. Fisher, III

[57] ABSTRACT

A method for recording uncoded ratings by multiple evaluators on a single automatic machine scannable document while maintaining independence of ratings and accuracy of results; the method comprising a machine scannable rating sheet and one or more rating shields corresponding to at least all but one of the rating areas to shield each area in succession to maintain independence of multiple uncoded ratings recorded on a single rating sheet whereby the recorded ratings are machine readable through the rating shields.

11 Claims, 4 Drawing Figures

METHOD FOR RECORDING UNCODED SCORES OR RATINGS BY MULTIPLE EVALUATORS ON A SINGLE AUTOMATIC MACHINE SCANNABLE DOCUMENT

BACKGROUND OF THE INVENTION

1. Field of the Invention

A method for recording uncoded ratings by multiple evaluators on a single automatic machine scannable document, maintaining independence of ratings and accuracy of results and permitting utilization of automatic optical scanning equipment in ratings capture.

2. Description of the Prior Art

The introduction of large-scale standardized writing examinations has greatly increased the need for automatic machine grading. Because written examinations must first be hand-scored by multiple graders and because each grader's score must be completely independent from any other grader's score, grades often are recorded on a sheet of paper and then are key-entered. Unfortunately, key operator entry is prone to error and multiple error opportunities are introduced as identification and score data are entered for multiple reading. Key entry errors pose serious additional problems when separate subtest component such as Reading test scores and Mathematics test scores must be merged with Writing test scores. Attempts have been made to use machine-scannable documents to collect multiple reader-assigned scores, but these attempts have required either the sacrifice of grader independence, introducing a serious measurement bias, or they have required using individually coded score scales for each rater, introducing the potential for substantial clerical error.

Various attempts have been made to provide solutions to some of these problems. Specifically, Parmenter (U.S. Pat. No. 2,373,498) discloses an answer sheet or sleeve 12 which slips over examination sheet 11 with the questions 10 imprinted thereon. Rugland discloses a self-scoring test device consisting of marking of the stations 14 which will alternatively show the correct answers as at 15A or incorrect answers as at 16A to the student as the test is actually marked.

Shaw (U.S. Pat. No. 3,203,116) is directed toward an electromechanical test scoring or grading sheet including slots 20/22 which cooperate with registry pens 26/28 respectively to ensure alignment of the completed test sheet 10 with the grading machine itself.

Parmenter (U.S. Pat. No. 3,266,049) discloses an examination paper in booklet form including an overlap answer column 16 corresponding to the questions sheets (page 12/14).

Sokolski (U.S. Pat. No. 3,900,961) simply shows a test sheet for use with an automatic machine grading including an answer control and selective answer column.

These efforts have focused on the design and use of answer documents either to provide immediate correct-answer information to examinees or to capture examinee responses on a machine scannable form. None of these efforts has responded to the need to capture through automatic machine scanning scores assigned by multiple graders ensuring grader independence, and tabulating and correlating with a high level of accuracy.

SUMMARY OF THE INVENTION

The present invention relates to a method for recording uncoded ratings by multiple evaluators on a single automatic machine scannable document to provide an effective and highly accurate means of scoring, grading, correlating and tabulating.

The method comprises an automatic machine-scannable grading sheet including an identification/information portion and a scoring portion for recording individual grader/rater/inspector evaluations. The identification/information portion may include name, social security number, birth date, sex or other unique information when used for student evaluation or parts/inventory or other identifying information when used for product inspection or evaluation. The scoring portion of the first section comprises a plurality of first scoring areas each including a grader/reader identification means such as a two-digit code and a first score comprising a plurality of preselected scoring levels. The sheets further include a discrete machine readable indicia corresponding to a particular sheet to permit machine correlating and tabulating.

A rating shield is affixed to the grading sheet corresponding to at least all but the last of the grading areas to maintain independence of the evaluator. Specifically, when each subsequent grader or evaluator is able to see and determine the grade assigned by the previous grader there is a tendency to follow this previous grading. This lack of independence seriously compromises the grading and, therefore, the results of the test itself. Thus, the labels or shields are used to mask the grading areas once a score is assigned by the individual grader.

In use, the graders or evaluators evaluate and grade the subject indicating the score in the scoring area provided. This is done successively with each grader or evaluator masking his or her individual grade evaluation.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a front view of the first sheet.
FIG. 2 is a front view of the second sheet.
FIG. 3 is a front view of the rating shield.
FIG. 4 is a side view of the rating shield.

Similar reference characters refer to similar parts throughout the several views of the drawings.

DETAILED DESCRIPTION OF THE PREFERRED EMBODIMENT

The present invention relates to a method for recording uncoded scores or ratings by multiple evaluators on a single automatic machine scannable document while maintaining independence of scores or ratings and maintaining accuracy of results. As described more fully hereinafter, this invention was conceived and developed to provide an efficient and highly accurate means of scoring, grading, correlating and tabulating multiple evaluations. The specific embodiment described relates to an educational testing system. However, the present invention is intended for use with any multiple evaluation use such as with quality control and the like.

Figure 1:
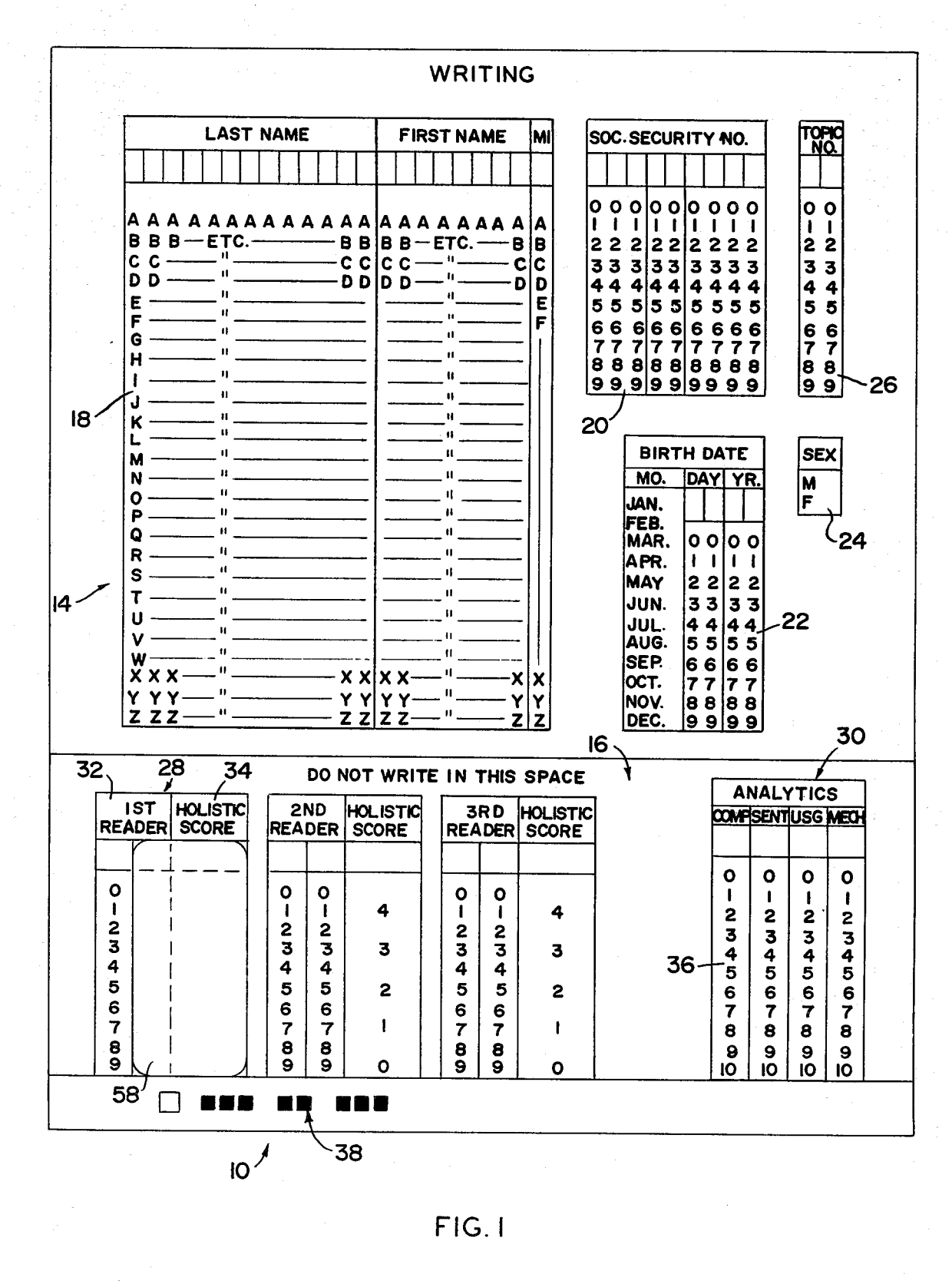
Figures 2, 3, 4:
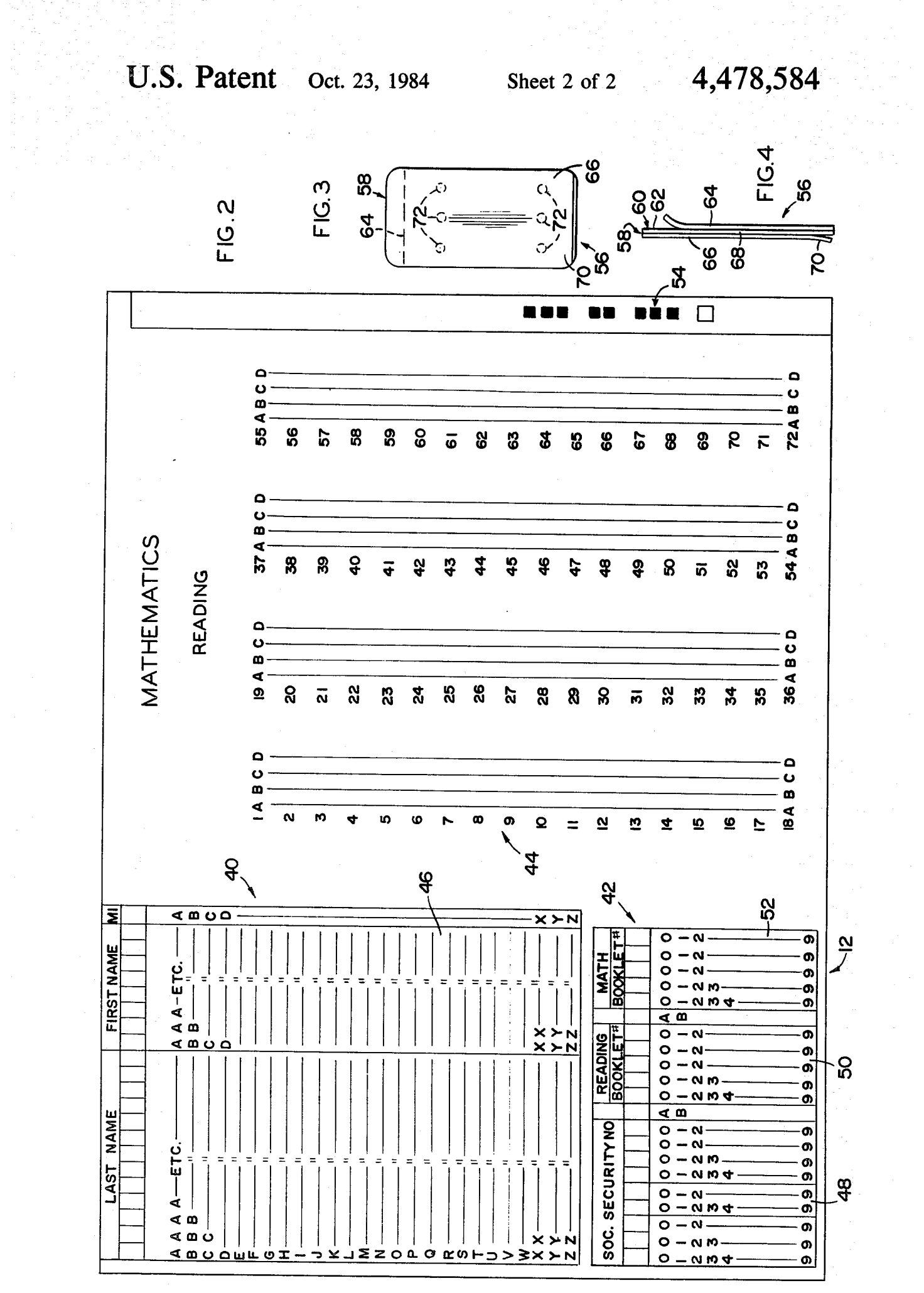

As shown in FIGS. 1 and 2, the method is directed for use with a grading sheet generally indicated as 10. In an alternate embodiment, an answer sheet 12 may be used. The grading sheet 10 comprises an information portion such as student name, part or serial number or the like, and a scoring portion generally indicated as 14 and 16 respectively for recording the grading evaluation on the graded element such as written essay answers or part quality. The information portion 14 may include name, social security number birth date, sex and other information as indicated in specific student information areas 18, 20, 22, 24 and 26 in the case of use in educational testing. Similarly, other pertinent information may be used in other applications. For scholastic uses, the scoring portion 16 comprises a plurality of scoring or grading areas each generally indicated as 28 and 30. When used with scholastic scoring each first, second or subsequent scoring area 28 includes a grader/reader identification means such as a two-digit code 32 and a score comprising a plurality of preselected scoring levels 34 or discrete performance traits 30 and subordinate traits 36. The first sheet 10 further includes a discrete machine readable indicia 38 corresponding to a particular booklet, student, or part number to permit machine correlating and tabulating of the separate subject components when multiple sheets are used.

When used for student testing, the answer sheet 12 comprises a student information portion 40, an information sheet 42 and a multiple choice portion 44. The student information portion 40 may include name and social security information 46 and 48 similar to that previously described with respect to the first section 10, and may further include booklet, test or test form identification 50 and 52 respectively. The answer area 44 comprises a plurality of multiple choice selections which are used to record the students' answer for any restricted response test question. In addition, the second sheet 12 includes a discrete machine readable indicia 54 corresponding to the particular booklet or student to permit machine correlating and tabulating with the first sheet or section 10.

FIGS. 3 and 4 show a rating shield generally indicated as 56 to be affixed to the grading or answer sheet 10 corresponding to at least all but one of the grading areas 28 to maintain independence of the evaluators. Specifically, when each subsequent evaluator is able to see and determine the grade or score assigned by the previous evaluator there is a tendency to follow this previous grading. This lack of independence seriously comprises the grading and, therefore, the results of the test itself. As shown generally in FIG. 3, the rating shield 56 comprises a substantially rectangular rating shield element 58 attached at its upper end portion thereof at 60 to the sheet 10 itself. On at least a portion of the remainder of the under surface 62 adjacent to the sheet 10 a detachable film-like member 64 is attached such that the film-like member 64 may be peeled off or removed to allow the masking of the individual scoring areas 28 as each evaluator completes scoring by pressing the rating shield element 58 against the sheet 10. More particularly, as shown in FIG. 4, the rating shield element 58 comprises an outer opaque member 66 detachably secured to an inner transparent member 68. The major portion of the interface between the inner and outer members 66 and 68 includes an adhesive to normally secure the two members 66 and 68 together. The lower portion of the interface does not include adhesive thus providing a pull-off tab 70 which permits removal of the outer opaque member 66 before introducing the sheet 10 to the automatic document scanner.

In addition, a red dot matrix is formed on the inner sufrace of outer opaque member 66, each dot of the matrix being indicated as 72 to inhibit or minimize visual detection of the assigned scorer evaluation through viewing of the back of the sheet 10.

In use for scholastic evaluation, the student answers the essay questions on a sheet (not shown). Then the student answers the multiple choice math and reading questions by the use of sheet 12. The evaluator then grades the written response indicating the score in the scoring area 28. This is done successively with each evaluator masking his or her individual grade evaluation.

When used for grading or evaluating parts in quality control or similar uses, the factors to be graded by the individual evaluators are similarly recorded.

It will thus be seen that the objects set forth above, and those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Now that the invention has been described,

What is claimed is:

1. A method for recording uncoded scores or ratings by multiple evaluators on a single automatic machine scannable document while maintaining independence of ratings and accuracy of results; the method comprising a machine scannable grading including a scoring portion having a plurality of scoring areas, rating shields corresponding to at least all but one of said scoring areas to shield each said scoring area in succession to maintain independence of multiple uncoded ratings recorded on said grading sheet whereby the recorded ratings are machine readable through said rating shields.

2. The method of claim 1 wherein each said rating shield comprises an opaque member affixed at one peripherial side thereof to said grading sheet, the inner surface of said opaque member adjacent said grading sheet including a pressure sensitive adhesive thereon.

3. The method of claim 2 wherein each said rating shield further comprises a transparent member including an adhesive on the inner surface thereof to permanently secure said rating shield to said grading sheet.

4. The method of claim 3 wherein a portion of the interface between said opaque member and said transparent member includes an adhesive to detachably secure said opaque member to the outer surface of said transparent member.

5. The method of claim 4 wherein each said rating shield further comprises a film-like member detachably secured to a portion of said inner adhesive surface of said transparent member to permit removal thereof by the individual evaluator to secure said rating shield to said grading sheet after scoring.

6. The method of claim 1 further including an information portion to receive identifying information corresponding to the graded subject.

7. The method of claim 1 wherein said scoring areas comprise at least two scoring areas for recording the grading evaluation of written answers by a corresponding number of evaluators in machine readable form.

8. The method of claim 7 further including an answer sheet for recording multiple choice answers in machine readable form for machine grading, said grading and answer sheets each including a predetermined code corresponding to each subject to permit merging of the subject's written and multiple choice scores.

9. A rating shield for use in selectively masking areas of an automatic machine scannable document comprising an inner transparent member and an outer opaque member, said inner transparent member having an adhesive on the inner surface thereof to permanently secure said inner transparent member to the automatic machine scannable document and said outer opaque member having an adhesive on at least a portion of the inner surface thereof to selectively secure said outer opaque member to said inner transparent member, such that said inner transparent member and said outer opaque member are secured to said automatic machine scannable document to visually mask a portion thereof and said outer opaque member is removed therefrom to permit scanning of the masked portion through said inner transparent member.

10. The rating shield of claim 9 further including a film-like member detachably secured to a portion of said inner adhesive surface of said transparent member to permit removal thereof by the individual evaluator to secure said rating shield to said grading sheet after scoring.

11. The rating shield of claim 9 further including a dot matrix formed on the inner surface of said outer opaque member.

* * * * *